United States Patent [19]

Dahlin et al.

[11] Patent Number: 5,008,953
[45] Date of Patent: Apr. 16, 1991

[54] MOBILE STATION LINK SUPERVISION UTILIZING DIGITAL VOICE COLOR CODES

[75] Inventors: Steinar J. E. A. Dahlin, Sollentuna; Walter Ghisler, Upplands Väsby, both of Sweden

[73] Assignee: Telefonaktiebolaget L M Ericsson, Stockholm, Sweden

[21] Appl. No.: 463,305

[22] Filed: Jan. 10, 1990

Related U.S. Application Data

[63] Continuation-in-part of Ser. No. 371,126, Jun. 26, 1989.

[51] Int. Cl.$^5$ ............................................. H04Q 7/04
[52] U.S. Cl. ..................................... 455/33; 455/54; 370/95.1; 375/5; 379/60
[58] Field of Search ....................... 455/33, 34, 38, 53, 455/54, 56, 67, 185, 186; 370/95.1; 375/5; 371/37.1, 38.1, 39.1, 44, 45; 379/59, 60, 63

[56] References Cited

U.S. PATENT DOCUMENTS

| | | | |
|---|---|---|---|
| 4,654,867 | 3/1987 | Labedz et al. | 455/33 |
| 4,754,453 | 6/1988 | Eizenhöfer | 370/95.1 |
| 4,763,322 | 8/1988 | Eizenhöfer | 370/95.1 |
| 4,765,753 | 8/1988 | Schmidt | 455/33 |
| 4,876,740 | 10/1989 | Levine et al. | 455/33 |

Primary Examiner—Curtis Kuntz
Attorney, Agent, or Firm—Burns, Doane, Swecker & Mathis

[57] ABSTRACT

A method and apparatus are disclosed for supervising a communication link in a cellular mobile radio system between a base station and a mobile station on a digital voice channel by utilizing digital voice color codes. The base station transmits bursts of communication data, which have an associated digital voice color code, to the mobile station. The mobile station, upon receiving the bursts and decoding the digital voice color code, compares the digital voice color code with a reference digital voice color code received during a call setup or handoff operation. A timer is initiated to time out the communication link after a predetermined period of time in response to the reference digital voice color code not being equivalent to a first predetermined number of the digital voice color codes received with the bursts. The timer is reset and deactuated in response to the reference digital voice color code being equivalent to the first predetermined number of consecutively received digital voice color codes of the bursts received by the mobile station. The communication link is disconnected when the reference digital voice color code is not equivalent to the first predetermined number of consecutive digital voice color codes received during the predetermined period of time clocked by the timer. After the timer is reset and deactivated, the received digital voice color codes are again compared with the stored digital voice color code. In the event that a second predetermined number of consecutively received digital voice color codes are not equivalent to the stored digital voice color code, the timer will be initiated again to possibly time out the communication link as described above.

27 Claims, 6 Drawing Sheets

MOBILE STATION LINK SUPERVISION UTILIZING DIGITAL VOICE COLOR CODES

This application is a Continuation-in-Part of U.S. patent application Ser. No. 07/371,126 filed June 26, 1989, entitled "Mobile Assisted Handoff".

FIELD OF THE INVENTION

This invention relates to cellular mobile radio systems having channels for transmitting digital or digitized information between base and mobile stations by transmitting digitally modulated radio signals in time multiplex. In particular, the present invention is directed to a method and apparatus for supervising call or link connections on a digital channel between a base station and a mobile station, at the site of the mobile station.

BACKGROUND OF THE INVENTION

In cellular mobile radio systems it is fundamental that a mobile station with an established connection on a radio channel should be able to maintain the established connection when moving from one cell served by one base station to another cell served by another base station. The process by which a mobile station maintains an established connection when moving between cells in a cellular radio system is generally called handoff. It is also highly desirous that a mobile station with an established connection on a radio channel be able to maintain the connection when moving within the same cell, even if the radio channel being used is subject to increased interference. If the quality of the established connection falls below specified parameters it is further desirable to automatically disconnect the connection in the event that handoff or other signal processing fails to improve the quality of the connection.

In general, radio communication is only possible when the desired information-carrying radio signals have sufficient signal strength at the receiver and are sufficiently strong in relation to noise and interfering radio signals at the receiver. The minimum strength of course depends on the particular features of the system, e.g., the kind of modulation and receiver used. In order to make sure an established connection may continue on a selected radio channel between a mobile station and a base station, handoff and disconnect processes perform various measurements on radio signals at the intended base and/or mobile stations.

The first cellular mobile radio systems in public use were analog systems for speech or other analog information. The systems comprised multiple radio channels for transmitting analog information between base and mobile stations by transmitting analog-modulated radio signals. These first cellular mobile radio systems had comparably large cells. In general, the signal measurements during the handoff and disconnect processes in such systems were performed by the base stations. One such system is the Nordic Mobile Telephone system NMT 450. Another known cellular mobile radio system, of particular interest as background to the present invention, is the AMPS mobile radio system utilized in the U.S.A.

Recently, digital cellular mobile radio systems for public use have been designed. Digital cellular mobile radio systems comprise digital radio channels for transmitting digital or digitized analog information between base and mobile stations by transmitting digitally modulated radio signals. Digital cellular mobile radio systems may offer substantial advantages over analog cellular mobile radio systems. To achieve these advantages there are certain demands. In particular, channel supervision must be frequent and the handoff and disconnect processes must be rapid and be allowed to be frequently carried out in relation to conventional analog systems.

One digital mobile radio system intended to be a common system for many European countries is the GSM system. In European countries already having an analog cellular mobile system, the new digital GSM system is intended to be introduced as a new system independent of any conventional existing analog systems. The GSM system base and mobile stations are not designed to be compatible with conventional existing systems, but give optimum performance in various aspects by themselves. Accordingly, there has been a comparatively great freedom of choice in technical matters when designing the GSM system. In particular, this is true with the handoff method in the GSM system. In the GSM system, measurements for the purpose of handoff and disconnect are done both by base and mobile stations.

In contrast to the introduction of a new independent digital cellular mobile radio system like the GSM system, in an area with an existing analog cellular system it has been proposed to introduce a digital cellular mobile radio system designed for cooperation with the existing analog cellular mobile radio system. To obtain digital radio channels within the frequency band allotted to cellular mobile radio systems, it is proposed to withdraw a number of radio channels allotted to present analog mobile radio systems and use them in the digital cellular mobile radio system. Due to the proposed design of the digital mobile radio system, three or possibly six digital radio channels may use, in time division multiplex, the frequency band of one previous analog channel. Accordingly, replacing some analog channels by multiplex digital radio channels in time division multiplex may increase the total number of radio channels in the joint analog and digital systems.

The intention in this regard is to gradually introduce the digital system and with time gradually increase the number of digital channels and decrease the number of analog channels in the coexisting cellular systems. Analog mobile stations already in use will be able to continue their use of remaining analog channels. New digital mobile stations will be able to use new digital channels. New dual-mode mobile stations will be able to use both remaining analog channels and new digital channels. In such a system, the handoff and disconnect processes for digital radio channels cannot simply be selected to be identical with the handoff and disconnect processes for a strictly digital system, e.g., the GSM system. The handoff and disconnect processes for digital channels must not interfere with the handoff and disconnect processes of the existing analog system and must not require changing of signals in the analog system.

In a dual-mode mobile station, it is desirable to provide the user with the same or comparable functionality in the digital mode as that which is available in the analog mode, since the user is often not aware of whether he is using an analog or a digital voice channel during any particular call. For example, one feature that is available in analog systems is the ability to continue a call without an automatic disconnect even though an interruption of the signal on the channel occurs for a short period of time, such as that which is occasioned by driving through a tunnel or the like. It is desirable to provide this same capability in the digital mode of operation. To this end, it would be further desirable to employ some of the existing equipment in the mobile station, which is used to provide this capability for the analog mode of operation, during the digital mode of operation as well.

SUMMARY OF THE INVENTION

The present invention is directed to a method of communication and a disconnect method particularly suitable for a cellular mobile radio system comprising base stations, mobile stations, radio channels for transmitting analog information between mobile stations and base stations by transmitting analog-modulated radio signals, radio channels for transmitting digital or digitalized information between mobile and base stations by transmitting digitally modulated radio signals in time division multiplex, and control channels for transmitting control information between base and mobile stations. In a system of this type, channel supervision to ensure adequate signal strength and control automatic disconnect is carried out in a conventional manner during the analog mode of operation, for example by means of a supervisory audio tone (SAT). In the digital mode of operation, the digital voice color code (DVCC) is monitored as a means of supervising signal strength and for control of the automatic disconnect function.

More particularly, the disconnect method according to the present invention comprises the following steps for supervising a link connection between a base station and a mobile station in a cellular mobile radio system having both analog and digital voice channels. During the establishment of a link connection between the base station and the mobile station on a digital voice channel, a voice channel designation message encoded with a predetermined digital voice color code is transmitted from the base station to the mobile station. Upon receiving the voice channel designation message on the digital channel, the mobile station decodes and stores the digital voice color code at the mobile station. The base station thereafter transmits bursts of communication data to the mobile station over the digital channel, with at least certain ones of the transmitted bursts having a digital color code encoded therein. The mobile station receives the bursts of communication data and decodes the digital voice color code from the received bursts. The mobile station compares the received digital voice color code with the digital voice color code stored at the mobile station.

A timer in the mobile station counts a predetermined period of time that is related to an acceptable interruption in the received signal, e.g. five seconds. When a first predetermined number of consecutively received digital voice color codes, associated with the bursts of communication data transmitted from the base station are equivalent to the previously stored digital voice color code, the timer discontinues the count and is reset. If the timer is not reset before the end of the predetermined period of time, due to the fact that the stored digital voice color code is not equivalent to the first predetermined number of consecutive digital voice color codes associated with the bursts of communication data received during the predetermined period of time clocked by the timer, the mobile station disconnects the communication link.

After the timer is reset and deactivated, the received digital voice color codes are again compared with the stored digital voice color code. In the event that a second predetermined number of consecutively received digital voice color codes are not equivalent to the stored digital voice color code, the timer will be initiated again to possibly time out the communication link as described previously.

DETAILED DESCRIPTION OF THE ILLUSTRATED EMBODIMENTS

Figure 1:
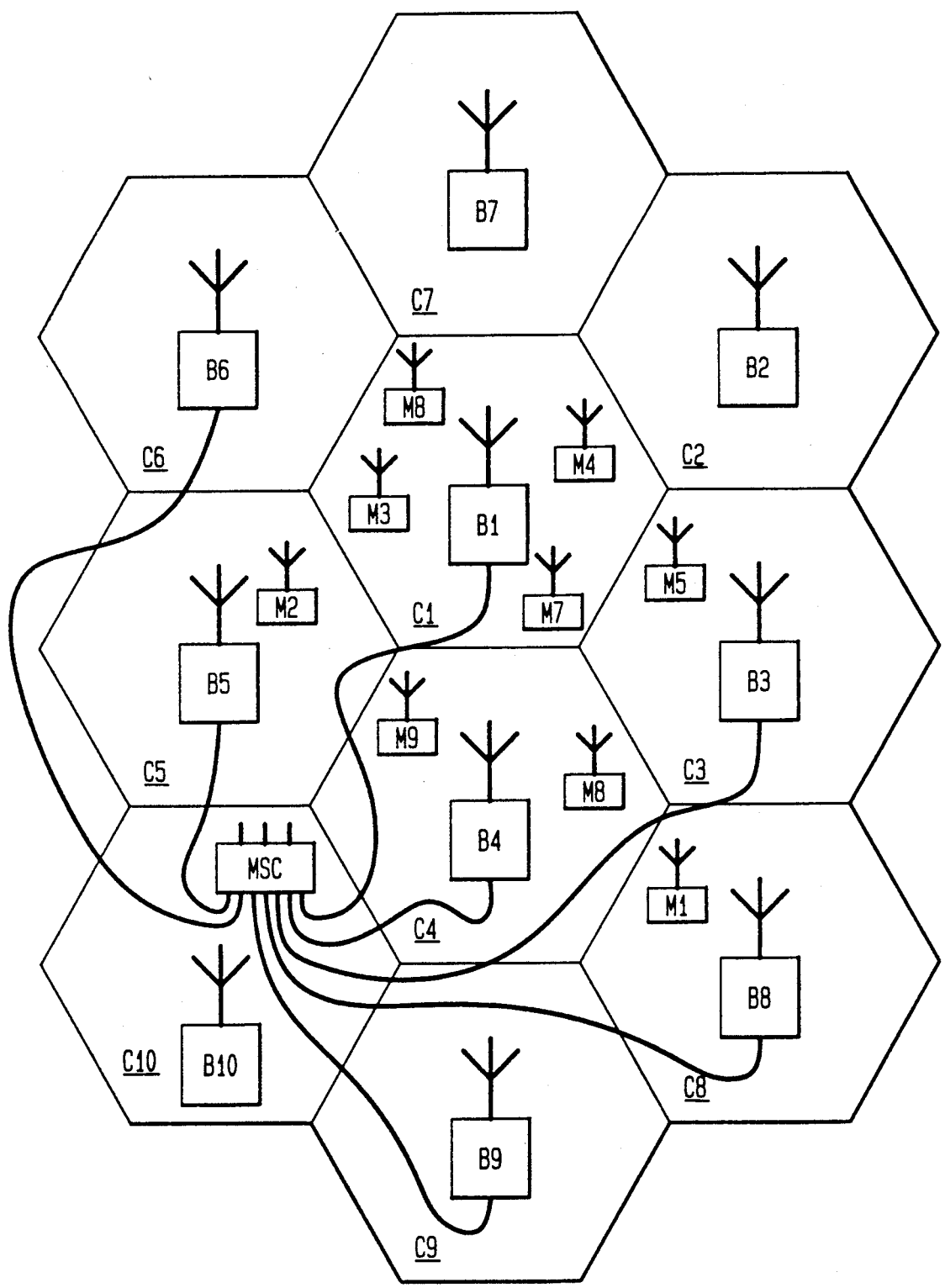
FIG. 1 illustrates part of a cellular mobile radio system with cells, a mobile switching center, base stations and mobile stations.

FIG. 1 illustrates a cellular mobile radio system of the type to which the present invention pertains. This illustrated system contains ten cells C1 to C10. Normally, the principles of the invention would be implemented in a cellular mobile radio system comprising many more cells than ten. However, for the purpose of explaining the present invention, ten exemplary cells are sufficient.

For each cell, C1 to C10, there is a base station B1 to B10 with the same number as the cell. FIG. 1 illustrates the base stations situated in the vicinity of each cell center and having nondirectional antennas. The base stations of adjacent cells may, however, be co-located in the vicinity of cell borders and have directional antennas as is well known to those skilled in the art.

FIG. 1 also illustrates ten mobile stations M1 to M10 movable within a cell and from one cell to another cell. Again, the present invention can be implemented in cellular mobile radio system comprising many more mobile stations than ten. In particular, there are normally many more mobile stations than there are base stations in any given system. However, for the purpose of explaining the present invention, ten mobile stations are sufficient.

Also illustrated in FIG. 1 is a mobile switching center MSC. The mobile switching center illustrated in FIG. 1 is connected to all ten illustrated base stations by cables. The mobile switching center is connected by cables also to a fixed public switching telephone network or similar fixed network with ISDN facilities. All cables from the mobile switching center to base stations and cables to the fixed network are not illustrated for purposes of clarity.

In addition to the illustrated mobile switching center there may be another mobile switching center connected by cables to base stations other than those illustrated in FIG. 1. Instead of cables, other means may be used for base to mobile switching center communications, e.g., fixed radio links.

The cellular mobile radio system illustrated in FIG. 1 comprises a plurality of radio channels for communication. The system is designed both for analog information, e.g., speech, digitized analog information, e.g., digitized speech, and pure digital information, e.g., pure data. In the context of this disclosure, the term "connection" is used to identify a communication channel between a mobile station and another mobile station in the same system or another system, as well as between the mobile station and a fixed telephone or terminal in a fixed network connected to the cellular mobile radio system. Thus, a connection may be a call where two persons talk to each other, but may also be a data communication channel where computers exchange data.

Figure 2:
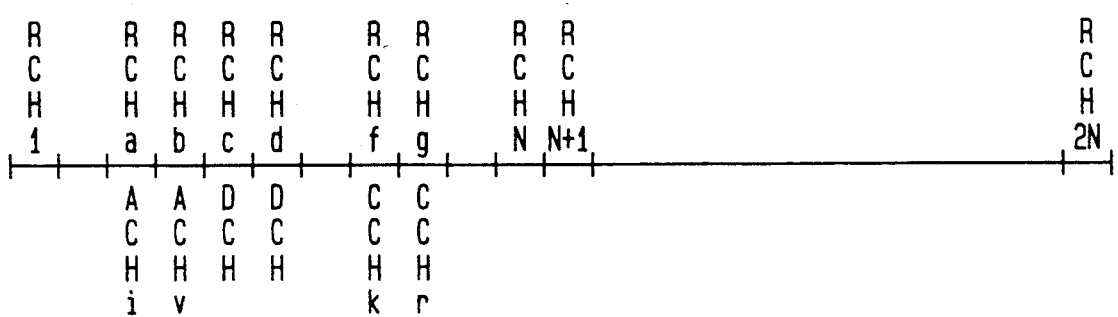
FIG. 2 illustrates a plurality of radio channels within a frequency band and use of some radio channels in a cellular mobile radio system of the type shown in FIG. 1.

FIG. 2 illustrates a plurality of radio channels $RCH_1$ to $RCH_{2N}$ within a frequency band. A first group of radio channels $RCH_1$ to $RCH_N$ are used in the cellular mobile radio system for transmission of radio signals from base stations to mobile stations. A second group of radio channels $RCH_{N+1}$ to $RCH_{2N}$ are used in the cellular mobile radio system for transmission of radio signals from mobile stations to base stations.

Figure 3:
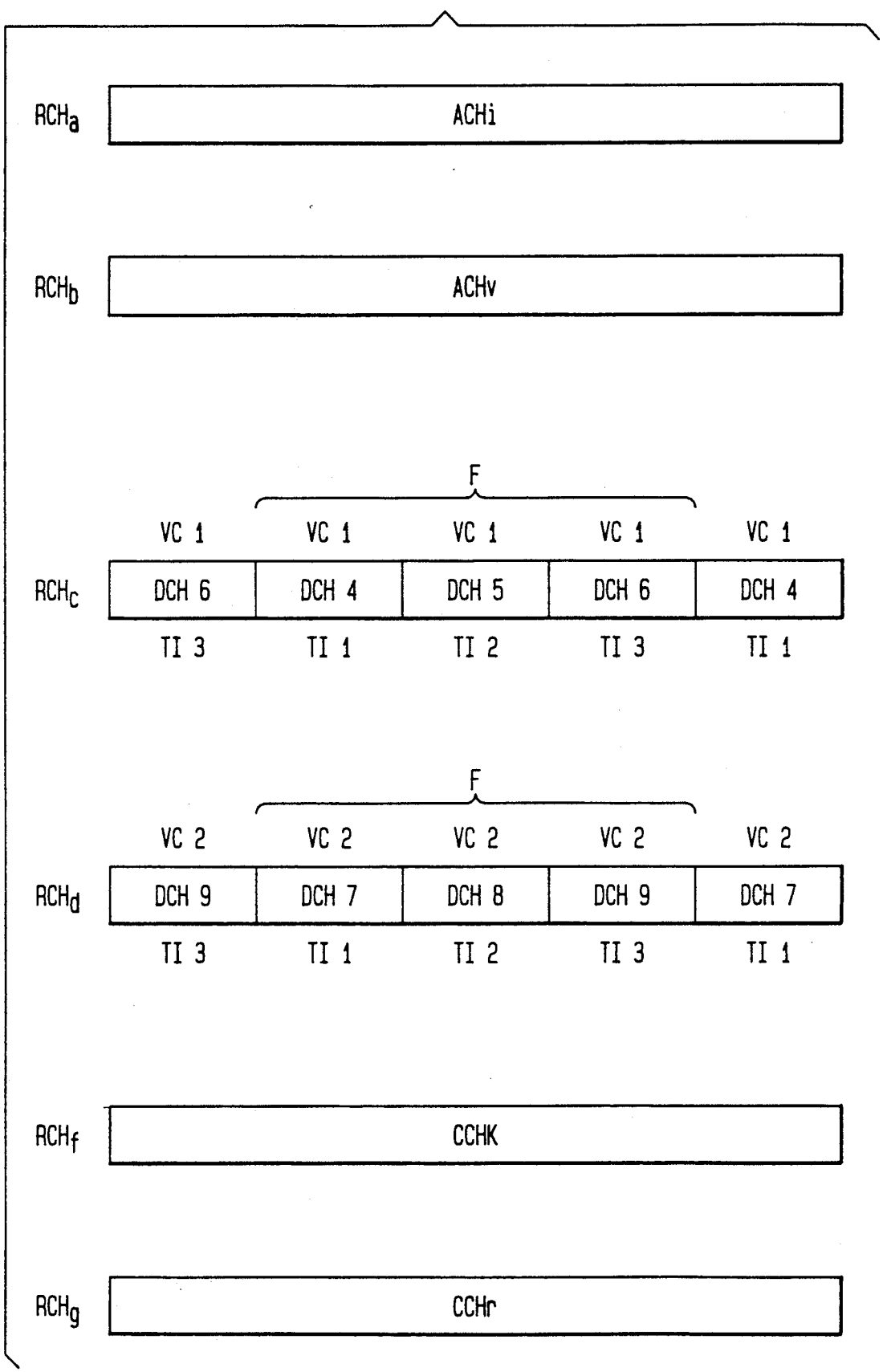
FIG. 3 illustrates the use of radio channels of the type shown in FIG. 2 for control channels, analog communication channels and time division multiplex digital communication channels in a cellular mobile radio system.

Some of the radio channels are used as control channels. Normally, each base station has at least one control channel. A control channel is usually not used for the transfer of information during a connection, but for monitoring and control of mobile stations during the set-up of a connection, maintaining an established connection and handoff of an established connection. FIG. 3 illustrates the particular function that is assigned to each channel. For example, the radio channel $RCH_f$ is used at all times as a control channel CCHk while the radio channel $RCH_g$ is used at all times as a control channel CCHr.

Some of the radio channels are used as analog communication channels. Normally, analog communication channels are used for connections where analog information is exchanged, e.g., telephone calls where two person talk to each other. Usually one analog communication channel is required for each such connection. When a radio channel is used as an analog communication channel, the information, e.g., speech, is transmitted with analog-modulated radio signals. In addition to the information transmitted via the connection, the analog communication channel may also be used for associated information, e.g., a supervisory audio tone. FIG. 3 illustrates how the radio channel $RCH_a$ is at all times used as an analog communication channel ACHi while the radio channel $RCH_b$ is at all times used as an analog communication channel ACHv. Normally, each base station has at least one radio channel that is used for analog communications.

Some of the radio channels are used as digital communication channels. Normally, digital communication channels are used for a connection where digital or digitized information is exchanged, e.g., data or digitized speech. The radio channels used as digital communication channels are divided into time slots and the time slots are grouped in frames. The time slots are allotted to digital communication channels whereby multiple digital channels share a common radio channel in time division multiplex. FIG. 3 illustrates a radio channel $RCH_c$ having three time slots in each frame F. A first of the time slots is allotted to the digital communication channel DCH4, a second of the time slots is allotted to the digital communication channel DCH5 and a third of the time slots is allotted to the digital communication channel DCH6. Thus, the radio channel $RCH_c$ is used for three digital communication channels. FIG. 3 also illustrates how the radio channel $RCH_d$ is used for three digital communication channels DCH7, DCH8 and DCH9 in a corresponding manner.

In FIG. 3, the frames F of information transmitted over the radio channels $RCH_c$ and $RCH_d$ each have three time slots. Depending on the required bandwidth of the various digital communications channels it is conceivable to have less slots in a frame, e.g., two slots, or to have more slots in a frame, e.g., six slots. When the digital communication channels are used for connections where digitized speed is exchanged, six time slots may produce poor speech quality if the radio channel bandwidth is 30 kHz, for example.

On a radio channel used for digital communications, the base or mobile station transmits a time slot identifier code with the radio signals at least in every time slot used for a connection. On a particular radio channel, e.g., $RCH_c$, the time slot identifier codes in different time slots are different. Thus, the time slot identifier code TI1 is transmitted in the first time slot of radio channel $RCH_c$ allotted to digital communication channel DCH4. The time slot identifier code TI2 is transmitted in the second time slot of radio channel $RCH_c$ allotted to digital communication channel DCH5. The time slot identifier code TI3 is transmitted in the third time slot allotted to digital communication channel DCH6. Neither the base nor the mobile station transmits any separate frame synchronization signal on the radio channel.

The same time slot identifier codes may be used on two or more radio channels, possibly all radio channels. FIG. 3 illustrates how the time slot identifier TI1 is transmitted in the first time slot of radio channel $RCH_d$ allotted to digital communication channel DCH7. The time slot identifier code TI2 is transmitted in the second time slot of radio channel $RCH_d$ allotted to digital communication channel DCH8. The time slot identifier code TI3 is transmitted in the third time slot of radio channel $RCH_d$ allotted to digital communication channel DCH9. Thus, the time slot identifier code does not alone identify the channel but identifies the time slot in a frame. It is conceivable to have one set of time slot identifiers TI1 to TI3 for channels with three-slot frames F and have a different set of time slot identifiers TI4 to TI9 for six-slot frames, whereby the time slot identifier also may indicate the number of slots in a frame of information on the radio channel.

On a radio channel used as a digital radio channel, a digital voice color code is also transmitted with the radio signals, at least in each time slot used for a connection. On a particular radio channel the same digital voice color code is transmitted with the radio signals in different time slots. FIG. 3 illustrates the transmission of the same digital voice color code VC1 in all time slots of the radio channel $RCH_c$. Normally, the same digital voice color code is used for all radio communications to and from a particular base station, e.g., the digital voice color code VC1 is used for all radio channels associated with the base station B1.

Some adjacent base stations may use the same digital voice color code, e.g., base stations B2, B6 and B7 may use the same digital voice color code as base station B1. Other base stations may use a different digital color code VC4. Still other base stations may use another different digital voice color code, e.g., base stations B3 and B8 use the digital voice color code VC7.

Figure 4:
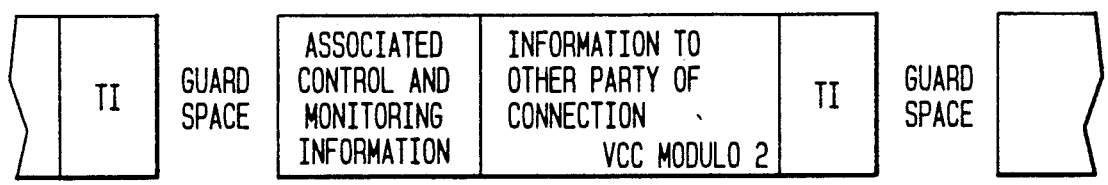
FIG. 4 illustrates bursts separated by guard spaces on a radio channel of the type shown in FIG. 3 that is used for digital communication channels in time division multiplex in a cellular mobile radio system such as that shown in FIG. 1.

The radio signals on a radio channel used for time division multiplex digital communications are transmitted in bursts. FIG. 4 illustrates a burst in a time slot separated by guard spaces from the end of the preceding burst and the beginning of a succeeding burst in adjacent time slots. A transmitted burst comprises at least a time slot identifier, abbreviated TI, and a digital voice color code, abbreviated VC, and normally also information to be forwarded to the other party in the connection, as well as connection or channel associated information for control or monitoring purposes.

The time slot identifier code is a binary word of many bits, e.g., 26 bits. It is well known to those skilled in the art that there is a need for receiver synchronization in time division multiplex radio communication systems. For this purpose, it is well known to transmit synchronization words or patterns in each burst and to transmit particular frame synchronization words or patterns from a master or base station to a slave or mobile station. Preferably, the time slot identifier code according to the present invention may also be used for synchronization of receiver to transmitter.

Theoretically, there exist a number of uncorrelated binary multi-bit words, e.g., 26 bit words, which may be used as different synchronization words. In a preferred embodiment of the present invention, one unique time slot identifier and synchronization word is required for each time slot in a frame on the channel. For the purpose of both time slot identification and synchronization, the time slot identifier code words are chosen for minimum correlation between each other and between themselves except for correlation to themselves in phase. Thus, a first time slot identifier code used to identify the first time slot of a frame and to synchronize the receiver to the transmitter should exhibit low correlation to an identical code when substantially out of phase, but exhibit high correlation to an identical code when substantially in phase. A second time slot identifier code used to identify the second time slot of a frame and to synchronize receiver to transmitter should also exhibit low correlation to an identical code when out of phase but exhibit high correlation to an identical code when substantially in phase. All other time slot identifiers used on the channel should also exhibit low correlation to an identical code when out of phase but exhibit high correlation to an identical code when in phase. Any time the time slot identifier code is used on the channel it should exhibit low correlation to any other time slot identifier code used on the channel irrespective of phase relationship, i.e., in phase or out of phase. Selecting time slot identifier codes in this way means that the implementation of time slot identifier codes does not require any dedicated bits for the time slot identifier codes.

Once the requirements on time slot identifier codes are determined, one skilled in the art will be able to readily select proper time slot identifier codes. However, for the convenience of those not skilled in the art the following eight 26-bit words are given as examples of possible time slot identifier codes for an eight slot frame:

| Time Slot | Code |
| --- | --- |
| 1 | 00100101110000100010010111 |
| 2 | 00101101110111100010110111 |
| 3 | 01000011101110100100001110 |
| 4 | 01000111101101000100011110 |
| 5 | 00011010111001001000110111 |
| 6 | 01001110101100001100111010 |
| 7 | 10100111110110001010011111 |
| 8 | 11101111000100101110111100 |

When there are less than eight time slots in a frame on the radio channel less than all of the given code words may be used. However, there may be advantages in using other than the given code words when there are only three time slots in a frame.

It is, of course, conceivable to use binary time slot identifier codes having more or less than 26 bits. Longer code words offer some advantages, but have the disadvantage of occupying more of the available space in a burst.

In the advanced mobile phone service system, abbreviated AMPS, there is a supervisory audio tone, abbreviated SAT, that is transmitted on analog communication channels. The reason for transmitting the SAT in AMPS is that, in an interference-limited mobile radio communication network, there should be some means for the receiving entity (e.g., base station), to identify the transmitting entity (e.g., mobile station) or at least with high likelihood exclude interchange of transmitter entities without the need for continuous transmission of transmitter identity. The object of the digital voice channel code in a cellular mobile radio system according to the present invention is at least partly the same as that of the SAT in AMPS. The number of different SATs is three in AMPS. The number of different digital voice color codes in a cellular mobile radio system is preferably much higher than three, mainly to support discontinuous transmission. Preferably, the digital voice channel code is a binary word having eight bits, enabling theoretically 256 different voice color codes.

Discontinuous transmission is a power saving function in hand-held mobile stations. The basic idea behind the function is that there is no need to have the mobile transmitter on when the mobile user is not talking or transmitting any data on a connection. In a cellular system with channel reuse limited by interference, the carrier of a mobile party to a connection suddenly disappears at the base station receiver and the burst of a possible interfering mobile using the same radio channel and time slot suddenly appears alone on the radio channel at the base station responsible for the connection. If the bursts of such an interfering mobile do not include a different digital voice color code than the silent mobile station party to the connection, the responsible base station party to the connection will not be able to distinguish the bursts of the interfering mobile from those of the silent mobile that is actually the party to the connection. Provided the signal strength of the interfering mobile is sufficient, the other party to the connection (not the silent mobile) will then overhear the conversation or data of the interfering mobile.

Accordingly, the number of different digital color codes should be high enough to guarantee that calls where the same radio channels are used and having the same color code are at a distance from each other sufficient not to cause co-channel interference. In case discontinuous transmission is used, the disturbing signal should not significantly exceed the level of noise. For this purpose, an eleven bit color code may provide the best results in normal cases. However, the longer the color code, the more space is required in the control channel in connection setup and handoff procedures. Considering the possible load on control channels, eight-bit digital voice codes are preferred. To provide for error correction, the digital voice color code can be encoded in a (12, 8) Hamming code, thus yielding a total field length of twelve bits. While the overall length of the digital voice color code field is twelve bits, the number of different possible digital voice color codes is 256 (or 255 if zero is omitted), which corresponds to an eight bit value.

It is possible to transmit the voice color code as a separate group of dedicated bits within a burst. However, separate digital voice color code requires space in the burst, thus reducing the space available for speech or data in the connection. To eliminate such overhead due to the voice color code, the following implementation of voice color code, which does not require any dedicated bits for the digital voice color code in a burst on a digital communication channel, could be utilized.

At the transmitter the digital voice color code is added bit-by-bit, modulo two, in a field under error detection, but without error correction within the information part of the burst after channel coding. At the receiver the bursts in the time slots are deinterleaved and checked. This check is done by adding bit-by-bit the known digital voice color code modulo two, as is done at the transmitter, before channel decoding and error detection. If no error is found after adding the digital voice color code modulo two, the information part of the burst is determined to have been sent from the expected transmitter and not from an interfering mobile.

Figure 5:
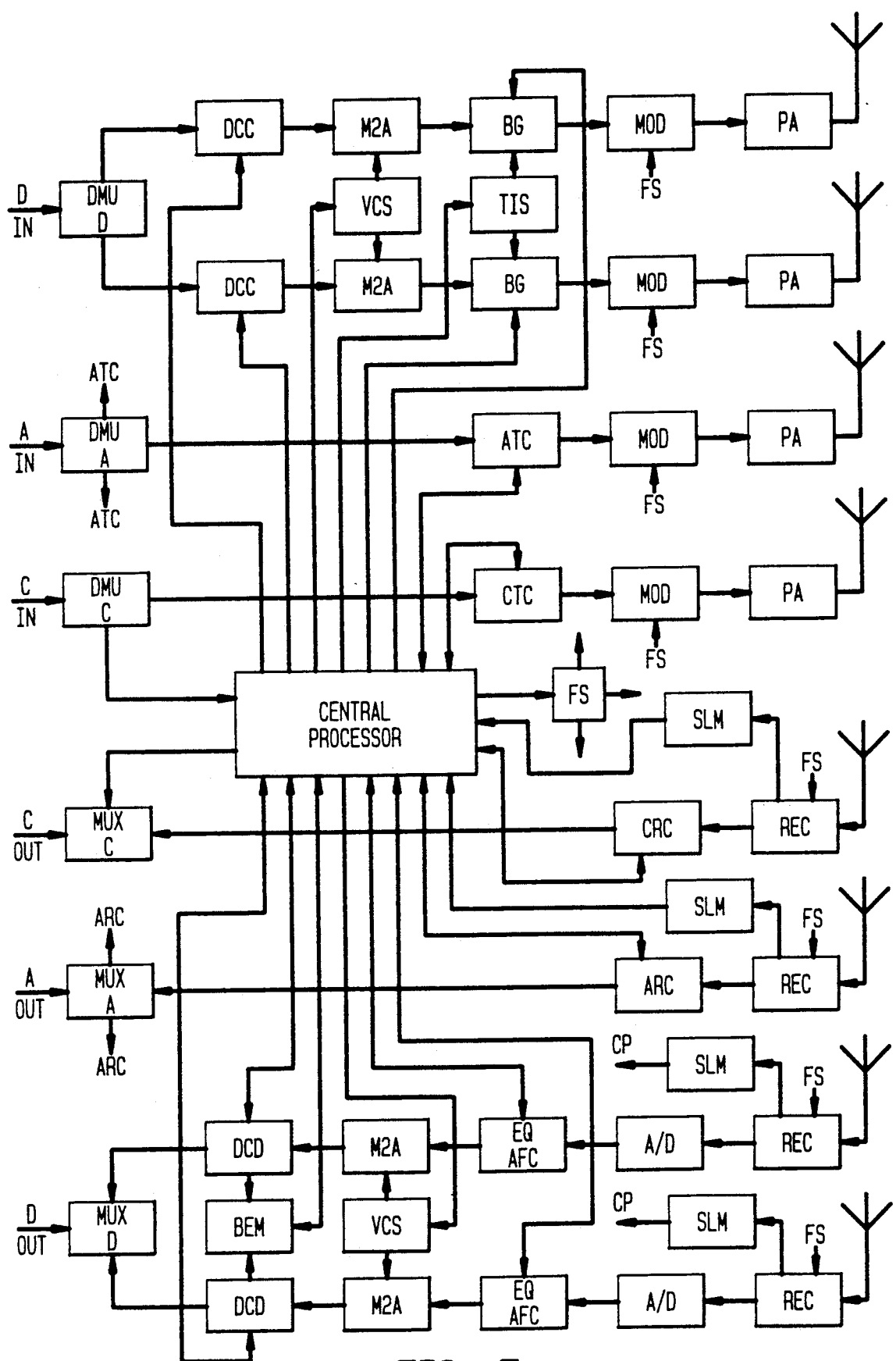
FIG. 5 is a block circuit diagram that illustrates a base station in a cellular mobile radio system with radio channels that are used as shown in FIGS. 2 through 4.

FIG. 5 illustrates a base station in a cellular mobile radio system according to FIG. 1 having radio channel assignments as shown in FIGS. 2 to 4. The base station is designed for transmission and reception over a plurality of radio channels used as digital communication channels, analog communication channels and control channels. In FIG. 5 not all base station equipment for all channels is illustrated. Normally, a base station has equipment for more channels, in particular analog communication channels, as well as other equipment for power supply, maintenance, etc., but the illustrated equipment is believed sufficient for the understanding of the present invention.

The base station is connected to a mobile switching center by six trunks. A first incoming trunk for digital communication channels is connected to a digital trunk demultiplexer and interface DMU-D. A second incoming trunk for analog communication channels is connected to an analog trunk interface and demultiplexer DMU-A. A third incoming trunk for control channels and base station control information is connected to a trunk interface and control information demultiplexer DMU-C. A first outgoing trunk for digital communication channels is connected to a digital multiplexer and trunk interface MUX-D. A second outgoing trunk for analog communication channels is connected to an analog multiplexer and trunk interface MUX-A. A third outgoing trunk for control channels and base station information is connected to a control information multiplexer and trunk interface MUX-C.

For each of the outgoing radio channels used as a digital communication channel, the base station comprises a digital channel coding unit, DCC, connected to a digital trunk demultiplexer and interface, DMU-D, modulo-two adding unit, M2A, burst generation unit, BG, modulator unit, MOD, and power amplification unit, PA, connected to an antenna. Two such outgoing radio channels share a digital voice color code unit, VCS, connected to their modulo-two adding unit. Two such outgoing radio channels also share a time slot identifier code unit, TIS, connected to their burst generators.

For each of the outgoing radio channels used as an analog communication channel, the base station comprises an analog transmission channel processing unit, ATC, connected to an analog trunk interface and demultiplexer, DMU-A, modulator unit, MOD, and power amplification unit, PA, connected to an antenna.

For each of the outgoing radio channels used as a control channel, the base station comprises an outgoing control channel processing unit, CTC, connected to the trunk interface and control information demultiplexer, DMU-C, a modulator unit, MOD, and a power amplification unit, PA, connected to an antenna.

For each incoming radio channel used as a digital communication channel, the base station comprises a radio receiver unit, REC, connected to an antenna, a radio signal strength or level measuring unit, SLM, an analog to digital conversion unit, A/D, a multipath equalizer and a burst synchronizing and time slot recognition and automatic frequency control unit, EQ-AFC, a modulo-two adding unit, M2A, and a digital channel decoder unit, DCD, connected to a digital multiplexer and trunk interface, MUX-D.

Two incoming radio channels used for digital communication share a digital voice color code unit, VCS, connected to their modulo-two adding unit. Two such incoming radio channels also share a digital channel bit error measuring unit, BEM, connected to their digital channel decoders, DCD.

For each incoming radio channel used as an analog communication channel, the base station comprises a radio receiver unit, REC, connected to an antenna, a radio signal strength or level measuring unit, SLM, and an incoming analog channel processing unit, ARC, connected to an analog multiplexer and trunk interface, MUX-A.

For each incoming radio channel that is used as a control channel, the base station comprises a radio receiver unit, REC, connected to an antenna, a radio signal strength or level measuring unit, SLM, and incoming control channel processing unit, CRC, connected to the control information multiplexer and trunk interface, MUX-C.

All modulation units and radio receiver units are connected to frequency synthesizer units, FS. The frequency synthesizer units are controlled by a central processor. The central processor also controls the DCCs, VCSs, BGs, EQ-AFCs, DCDs, BEM, ATC, ARC, CTC, CRC, and MUX-C. Preferably the central processor is not the only processor in the base station but other units may also comprise processors, in particular the ATC, ARC, CTC, CRC and EQ-AFCs.

The base station according to FIG. 5 is capable of communicating with a mobile station that only has equipment designed for analog communication channels and control channels. The base station is also capable of communicating with mobile stations that only have equipment for digital communication channels and control channels. The base station can further communicate with dual mode mobile stations designed for communication on both analog and digital communication channels as well as control channels. Mobile stations designed only for analog communication channels may be of a kind well known to those skilled in the art and operate according to AMPS standard. Accordingly, there is no need for further describing such a mobile station or its operation here. There is also no need for describing parts of dual-mode mobile stations used only for communication on analog or control channels.

Figure 6:
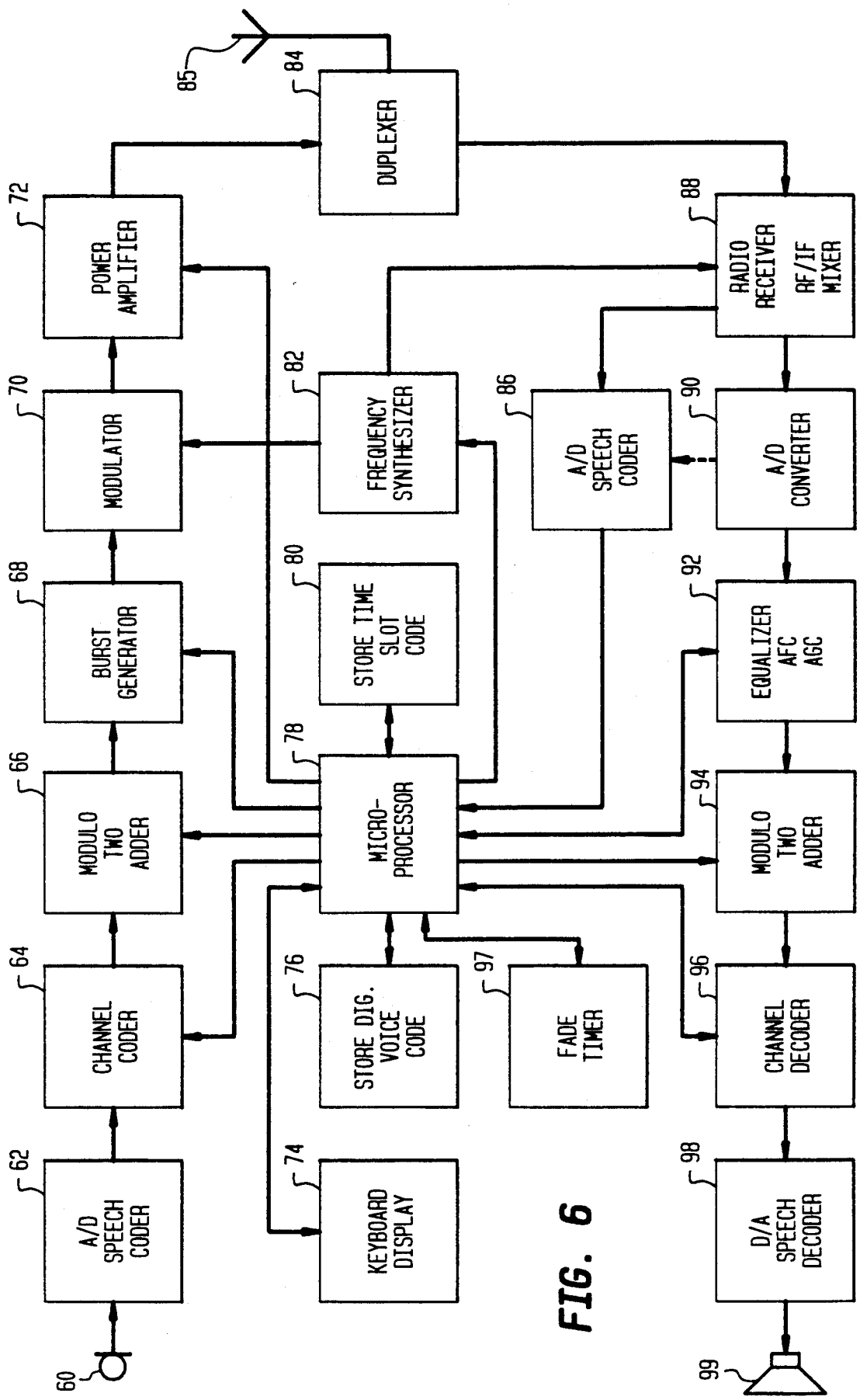
FIG. 6 is a block circuit diagram that illustrates a mobile station in a cellular mobile radio system for communication with a base station on control and digital communication channels that are allocated as shown in FIGS. 2 through 4.

FIG. 6 illustrates a mobile station in a cellular mobile radio system according to FIG. 1 for communication with a base station according to FIG. 5 over radio channels allocated as shown in FIGS. 2 to 4.

The mobile station comprises a microphone 60 connected to an analog-to-digital speech coding unit 62 for coding speech or sound into a binary code with a bit rate or bandwidth less than 11 kHz, preferably about 7 to 8 kHz. Connected to the speech coding unit 62 is a channel coding unit 64 for interleaved error protection coding of the digital information from the speech coder. The channel coder 64 is connected to a modulo-two adder 66 for modulo-two adding of a digital voice color code to the digital information from the channel coder 64 if necessary. The modulo-two adding unit 66 is connected to a burst generator 68 for collecting information to be transmitted in a burst and arranging the information, including the time slot identifier code, into a proper burst. When the mobile is used for data transmission during a connection or for a connection setup, the burst generator 68 puts data and/or control information in the burst instead of digitized speech. Such information may be supplied from a keyboard and display device 74 via a microprocessor 78 and the channel coder 64 or directly from the microprocessor 78. A modulator 70 is connected to the burst generator for receiving digital information to be modulated on a radio frequency carrier from a frequency synthesizer 82 and amplified in a power amplifier 72. The modulation method used may be continuous phase modulation or other types suitable for digital information transmission. The power amplifier 72 is connected to an antenna 85 via a duplexer 84 and is controlled from the microprocessor 78. During call setup or handoff, or during the termination procedures, the microprocessor 78 may control the burst generator 68 and/or the frequency synthesizer 82 to supply the modulator 70 with control carriers or other control information to be modulated on the radio channel carrier in accordance with system standards, e.g. AMPS standard.

The mobile station also comprises a radio receiver 88 connected to the duplexer 84, a radio signal strength or level measuring unit 86 and an analog-to-digital conversion unit 90. The radio receiver 88 comprises RF and IF stages with filters, demodulators, etc. A unit 92 for equalizing the digital communication channel and automatic frequency control and automatic gain control are connected to the radio receiver output and the input of a modulo-two adder 94. In situations where the encoded digital voice color code is transmitted modulo-two encoded instead of in a separate DVCC field, the modulo-two adder 94 adds a digital voice color code, modulo two, to the digital information from the equalizer 92. The modulo-two adder output is connected to a channel decoder 96 for deinterleaving and error detection and correction of digital information from the modulo-two adder 94. A unit 98 for converting digital information to analog information or speech is connected to the channel decoder 96 and a loudspeaker 99.

When the mobile station is tuned to a radio channel used by a base station as a control channel, some of the equipment of the mobile station is not used. When control and monitoring information is transmitted from the base station on the control channel according to the AMPS standard, the microprocessor receives and interprets signals from the analog-to-digital converter.

Except for the units pertaining to the time slot identifier and the digital voice color code, the mobile radio according to FIG. 6 operates to communicate over time division multiplex digital communication channels in a manner similar to known digital mobile radio stations, e.g. of the kind disclosed in the GSM standard or in Ericsson Review No. 3, 1987. Accordingly, there is no need here to further describe in detail the overall operation or the detailed operation of the various units. Regarding the time slot identifier code and the digital voice color code, the mobile station comprises a unit 80 for storing all possible time slot identifier codes and a unit 76 for storing digital voice color codes to be used in communication with a base station. The microprocessor receives instructions from the base station as to which codes to use in a particular connection and reads the codes from the units 76 and 80, and supplies the modulo-two adders and burst generator with the appropriate time slot identifier code and digital voice color code.

When receiving radio signals from a base station, synchronization and recognition of the time slot identifier is performed in the equalizer 92 in cooperation with the microprocessor 78. In situations where the digital voice color code is not transmitted modulo-two encoded, but in a separate DVCC field, recognition of DVCC is performed in the equalizer 92 and/or the channel decoder 96 in cooperation with the microprocessor 78. Measurement of bit error rate in an established connection is performed in the channel decoder 96 in cooperation with the microprocessor 78. Equalizers and methods of synchronization and bit error measurement are well known to those skilled in the art. Accordingly, these operations are not further described herein.

The procedure for connection setup in a cellular mobile radio system according to FIG. 1, with a base station according to FIG. 5 and a mobile station according to FIG. 6, may be similar to the corresponding procedure in AMPS when the channel to be used is an analog communication channel. However, when the channel to be used for the connection is a digital communication channel as shown in FIGS. 3 and 4, the base station informs the mobile station about the radio channel, the time slot and the digital voice color code to be used. During the setup procedure, the base station also informs the mobile station, over a plurality of radio channels, of the signal strength to be measured by the mobile station. Normally, this plurality of radio channels are the radio channels used for control channels by adjacent bases/cells. Depending upon the movement of the mobile stations as well as other circumstances, a new plurality of radio channels may be selected and corresponding information is transmitted to the mobile station from the responsible base station during the course of the connection. During a connection for which a digital communication channel is used, the mobile station measures the signal strength of signals on the given plurality of radio channels. Measurements may be done during time slots not used by the digital communication channel.

The mobile station also measures signal strength on the digital communication channel used for the established connection and the bit error rate on the established connection. The mobile station transmits the results of its measurements, preferably averaged, frequently to the base station, preferably twice a second.

The base station also measures signal strength on the digital communication channel used for the established connection and the bit error rate for the established connection. The base station processes and analyzes the results of its own measurements and the measurements of the mobile station and compares them with criteria for handoff. When, according to the results and criteria, a handoff is desirous the base station informs the mobile switching center indicating at least one target base station assumed to be suitable for taking over the responsibility for the communication with the mobile.

The mobile switching center requests the target base station(s) to measure signal strength on a radio channel in a time slot used by the mobile for the established connection. The mobile switching center also informs the target base station of the digital voice color code used by the mobile station.

The target base station or stations tune a receiver to the radio channel indicated by the mobile switching center and use the time slot identifier of the indicated time slot for burst synchronization. The target base station checks the appearance of the digital voice color code indicated by the mobile switching center and measures the signal strength of the burst signals, provided the digital voice color code is correct. The target base station then transmits its results of signal strength measurement to the mobile switching center. The target base station also informs the mobile switching center on the result of checking the appearance of the digital voice color code, that is whether the digital voice color code appeared in the burst in the time slot of the radio channel.

The mobile switching center determines whether handoff to a target base should be performed, taking the results of the signal strength measurements of the target bases into account as well as other circumstances, e.g. traffic load.

When the mobile switching center determines that handoff shall be performed it transmits to the responsible base and the target base information on the new radio channel, new time slot and new voice color code to be used by the mobile station for the connection after handoff and the new radio channel to be used by target base station for the connection after handoff.

The responsible base station forwards information on the new radio channel, new time slot and new digital color code to the mobile. After receiving this information the mobile station tunes to the new radio channel to be used for the connection by the target base station and looks for the new time slot identifier code in received signals on the radio channel. The mobile station uses the new time slot identifier code in received signals for burst synchronization. After synchronization and tuning its transmitter to the new radio channel, the mobile station begins transmitting bursts in the new time slot on the new radio channel. The new digital voice color code is transmitted with each burst.

The target base station tunes a receiver to the new radio channel to be used for the connection by the mobile station and looks for the new time slot identifier code. The target base station uses the time slot identifier code for synchronization. The target base station then looks for the new digital voice color code in signals in the new time slot of the new channel. If the target base station identifies the new digital voice color code in the bursts in the new time slot of the new radio channel, this is reported to the mobile switching center. The mobile switching center then interprets the handoff as successful and acts accordingly. After successful handoff the former target base station, now being the responsible base station, informs the particular mobile station of a new plurality of radio channels whose signal strength is to be measured by the mobile.

The intelligence and decision making in a mobile cellular system according to FIG. 1 may be more or less centralized to the mobile switching center or more or less decentralized to the base stations. In a decentralized system more or less of the functions of the mobile switching center during the handoff preparation and performance may instead be performed in the responsible and/or target base stations.

In the embodiment of the handoff method described above the responsible base station and mobile station use the same time slot identifier code and the same digital voice color code. However, it is conceivable to use a different time slot identifier at the base and mobile stations for a particular connection.

In the embodiment of the handoff method described, the mobile station measures signal strength on radio channels used for control channels by the base station. However, it is conceivable to request the mobile station to measure signal strength on radio channels used for digital communication channels by the base station, in particular when there are no radio channels entirely used as control channels by the base stations.

According to the present invention, the digital voice color code is utilized for link supervision purposes at the mobile station. The purpose of determining radio link failure in the mobile station is to ensure that call connections with unacceptable voice/data quality, which cannot be improved either by RF power control or handoff, are released in a regulated and defined manner. In general, the parameters which will control the forced release or disconnection of the call should be set such that the forced release will not occur until the call connection has degraded to a quality below that at which the majority of subscribing users would have disconnected the call manually. This type of link supervision will ensure, for example, that a call connection which is on the edge of a radio coverage area and having bad quality, can be completed if the subscribing user desires.

Typically, when supervising the radio link on an analog voice channel, the mobile station must determine if a SAT is present. The determination of the presence of SAT is not necessarily performed continuously, but should be made at frequent intervals, e.g. once every 250 msec. In response to the SAT determination, the mobile station performs one of two functions. First, if no valid SAT is detected or the measured SAT determination does not agree with the SAT received in the mobile station control message, a fade timing status is enabled. Otherwise, the fade timing status is disabled. The fade timing status controls the operation of a fade timer 97 in the mobile station. When the fade timer 97 reaches a predetermined count, the microprocessor 78 disconnects the call.

In accordance with the present invention, a similar type of capability can be provided during digital communications through appropriate monitoring of the digital voice color codes. The digital voice color codes are utilized in conventional systems to distinguish the currently used digital channel from voice co-channels. In the conventional use of the digital voice color codes, if a valid digital voice color code is detected by the mobile station, but does not correspond with the digital voice color code received in the initial voice channel designation message at the call setup or handoff, the receiver audio of the mobile station is muted in order to prevent the reception of data not intended for that particular mobile station.

The monitoring of the digital voice color code in accordance with the present invention, to determine whether a call should be automatically disconnected, will now be described. The digital voice color code is encoded on specified bursts transmitted by a base station, during both the initial setup of a connection and during the communication of information. Preferably, the digital voice color code will be encoded in every burst transmitted from the base station, but it should be transmitted with at least every other burst. Generally speaking, during the channel supervisory process according to the invention, a digital voice color code (DVCCr) received at the mobile station is compared to a stored digital voice color code (DVCCs), which was earlier received in the voice channel designation message at the call setup or handoff. Depending on the result of this comparison, a DVCC status, and thus the fade timing status, may be enabled (a correct digital voice color code) or disabled (an incorrect digital voice color code).

Figure 7:
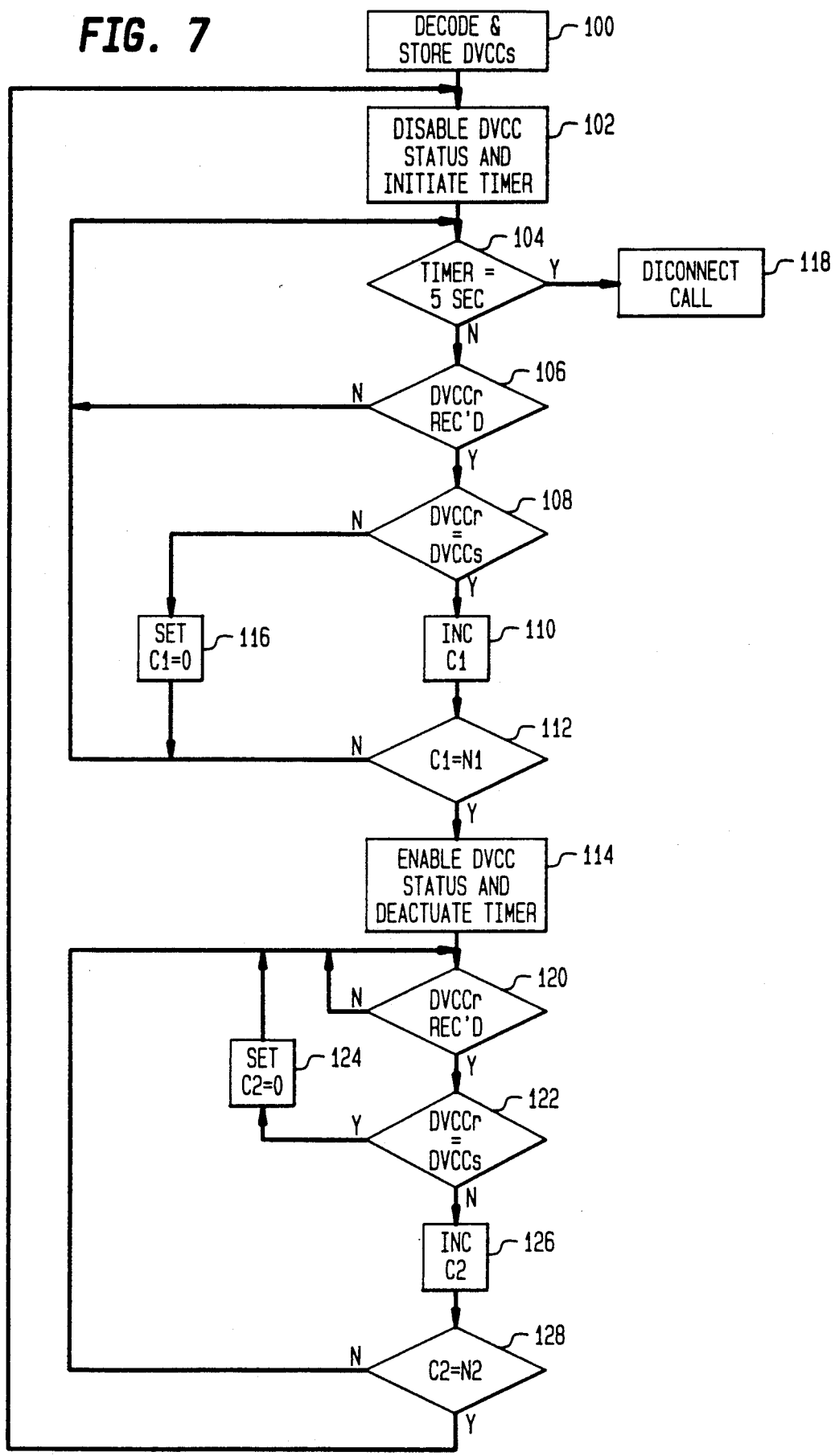
FIG. 7 is a flow chart illustrating the supervision of a connection at a mobile station through the monitoring of the digital voice color codes.

At the time the voice channel designation message comprising the digital voice color code to be used by the base station for the connection is received by the mobile station, the microprocessor 78 decodes the message to retrieve the digital voice color code. This received digital voice color code is stored as a value DVCCs whereafter the DVCC status is disabled. The subsequent detection and setting of the DVCC status performed by the mobile station involves the following steps, which are illustrated in the flow chart of FIG. 7. For each burst transmitted over the designated channel which contains a digital voice color code, the microprocessor 78 decodes the received bits to retrieve the 8-bit digital voice color code. This received digital voice color code may be temporarily stored as a value DVCCr if not immediately compared with the stored DVCCs (step 100).

After the value for DVCCs is stored, the DVCC status is initially disabled and the fade timer 97 is initiated to count elapsed time (step 102). At step 104, the microprocessor 78 checks the status of the timer 97 to determine whether the timer has counted a period of 5 seconds (or any other period of time that is determined to be an acceptable period of silence before a call is automatically disconnected). Since this step immediately follows the initiation of the timer, this period of time will not have elapsed and the microprocessor continues to step 106 where it determines whether a digital voice color code has been received. If no DVCC has been received, the microprocessor continues in the loop of checking the elapsed time and determining whether a DVCC has been received. If the proper sequence of DVCC is not received within the time period of 5 seconds, the microprocessor will branch to step 118 where it carries out the appropriate routine to disconnect the call.

Once a DVCC is received, the microprocessor compares the received code, DVCCr, with the stored code, DVCCs (step 108). If the received code is the same as the stored code, the value C1 of a counter is incremented (step 110) and then checked to determine whether it is equal to a value N1 (step 112). The value C1 of the counter is initially set to zero when the connection is first established. The value N1 is chosen as the number of consecutive times that the proper DVCC must be received within the time period counted by the timer 97 to verify that the connection is of acceptable quality. For purposes of illustration only, the value of N1 is chosen as 2 in this example. At the time the first DVCC is received and is equal to DVCCs, the value of C1 will be equal to one at step 112. The microprocessor therefore returns to step 104, where it checks the elapsed time counted by the timer 97. If DVCCr does not equal DVCCs at step 108, the microprocessor branches to step 116 where C1 is reset to zero and the microprocessor checks if the 5 second time period has elapsed.

As long as the proper DVCC continues to be received, the microprocessor proceeds in this manner. Thus, after the second consecutive valid DVCC is received, the microprocessor detects at step 112 that C1 is equal to N1. Therefore, it proceeds to step 114 where it enables the DVCC status (for example by setting a flag) and deactuates the timer 97. The value C1 of the counter is set to zero.

If, however, the timer 97 times out before a valid DVCC is received N1 consecutive times the microprocessor branches to step 118 where the call will be disconnected.

Each time that a valid DVCC that is received in succession after the timer 97 is deactuated at step 114, the timer is not again actuated to measure the predetermined time period until a second condition occurs. Thus, as long as the proper DVCC continues to be received, the timer will not reach a count of 5 seconds because the timer is not actuated. It should be noted that the timer 97, is preferably reset at some point before it is reintiated, however, this is not always necessary.

When a DVCC is received after the deactuation of timer 97 at step 114, the microprocessor 78 will detect this at step 120. The microprocessor compares the received code, DVCCr, with the stored code, DVCCs (step 122). If the received code is not equivalent to the stored code, the value C2 of the counter is incremented (step 126) and then checked to determine whether it is equal to a value N2 (step 128). The value of C2 of the counter is initially set to zero. The value N2 is chosen as the number of consecutive times that the proper DVCC is not received following the deactuation of the timer 97 in order to maintain an acceptable quality of the connection. For purposes of illustration, the value of N2 is chosen as 5 in this example. If DVCCr is equal to DVCCs, the microprocessor branches to step 124 where C2 is reset to zero and then to step 120 to await receipt of the next code DVCCr. At the point when C2=N2 (in this example the value of 5) consecutively received codes are not the same as the stored code DVCCs, the microprocessor 78 branches back to step 102 where the DCVV status is disabled and timer 97 is reinitiated. At this point the microprocessor follows the steps described previously to determine if the call should be disconnected.

The following example will further clarify the operation of the present invention. In the event that upon call setup or handoff, two consecutive bursts with the correct digital voice color code are received, the microprocessor will enable the DVCC status and deactuate the timer. Thereafter, even if every other received code does not equal the stored code, the timer is not actuated and there is no danger of an automatic call disconnect. Only when, in this example, five consecutive received codes do not equal the stored code, whereupon the timer is again activated, is there a possibility of call disconnection. After the timer is actuated, two consecutive digital voice color codes which are equal to the stored code must be received within the time period in order to avoid disconnection of the call.

Thus, it can be seen that proper reception of DVCC is monitored at the mobile station as a means of supervising the quality of a mobile telecommunications link during a digital communication. As long as the proper DVCC is received N1 consecutive times during a preset period of time and thereafter N2 consecutive incorrect DVCC are not received, the quality of the link is judged to be acceptable, and the connection is allowed to continue. This approach is entirely compatible with the supervision of the link during analog communications, and in fact, even makes use of the same timer 97, thereby providing an economically feasible solution in mobile units which are designed for both digital and analog communications in a dual-mode system. Although the values for N1 and N2 are chosen as 2 and 5, respectively, and the time-out period is set at 5 seconds in the example given above, it will be appreciated that any suitable values for N1, N2 and the time-out period can be chosen, depending upon the particular conditions and desired criterion for the acceptable quality of the connection.

The behavior of the mobile system utilizing digital voice channels will be comparable to the use of analog voice channels. The subscribing user of a dual mode mobile station in most instances will be unaware of whether he is using an analog or digital voice channel. Thus, the fade timer 97 is used for timing out call connections on either the analog or digital channel after a predetermined period of silence.

What is claimed is:

1. In a mobile radio telecommunications system of the type in which digitally-encoded information is transmitted between a base station and mobile stations in bursts over digital radio channels, and at least some of the bursts of information transmitted over the digital radio channels contain digital voice color codes, a method for supervising the quality of a connection between the base station and a mobile station comprising the steps of:

(a) transmitting a digital voice color code from said base station and storing said digital voice color code at a mobile station during the establishment of a connection between said base station and said mobile station over a designated digital communication channel;

(b) transmitting bursts of information between said base station and said mobile station, with at least some of said bursts of information containing said digital voice color code;

(c) initiating a timer to count a predetermined period of time;

(d) comparing a digital voice color code contained in a burst of information received at said mobile station with said stored code to determine whether the received code matches the stored code;

(e) detecting whether a first predetermined number of digital voice color codes which match said stored code are received at said mobile station during said predetermined period of time; and (f) terminating said connection if said first predetermined number of digital voice color codes which match said stored code are not received at said mobile station during said predetermined period of time.

2. The method of claim 1, wherein said detecting step includes the step of determining whether said first predetermined number of digital voice color codes which match said stored code are consecutive codes received at said mobile station over said channel.

3. The method of claim 1, further comprising the step of:

(g) deactivating said timer in response to detecting that said first predetermined number of digital voice color codes received at said mobile station during said predetermined period of time match said stored code.

4. The method of claim 3, further comprising the steps of:

(h) comparing a digital voice color code contained in a burst of information received at said mobile station, after said timer is deactivated, with said stored code to determine whether the received code matches the stored code;

(i) detecting whether a second predetermined number of digital voice color codes which do not match said stored code are received at said mobile station; and (j) returning to step (c) of said method to initiate said timer to count said predetermined period of time and continuing with the subsequent steps of said method in response to detecting that said second predetermined number of digital voice color codes received at said mobile station do not match stored code.

5. The method of claim 4, wherein said detecting step includes the step of determining whether said second predetermined number of digital voice color codes which do not match said stored code are consecutive codes received at said mobile station over said channel.

6. The method of claim 1, wherein said digital voice color code is contained in at least every other burst of information transmitted from said base station to said mobile station over said channel.

7. The method of claim 6, wherein said digital voice color code is contained in every burst of information transmitted from said base station to said mobile station over said channel.

8. A mobile station for use in a mobile radio communication system of the type in which digitally encoded information is transmitted between a base station and the mobile station in bursts over a digital communication channel, with at least some of the bursts of information containing digital voice color codes, said mobile station comprising:

a memory for storing a digital voice color code;

means for initiating a timer for counting a predetermined period of time;

a receiver for receiving bursts of information transmitted from said base station to said mobile station during a connection between said stations on a designated digital communication channel;

a decoder for detecting any digital voice color codes contained in bursts of information received over said designated channel during a connection;

means for determining whether a first predetermined number of digital voice color codes which match the digital voice color code stored in said memory are received during the predetermined time counted by said timer; and means for terminating said connection if said first predetermined number of codes are not received during said period of time.

9. The mobile station of claim 8, wherein said determining means determines whether said first predetermined number of digital voice color codes which match said stored code are consecutively received during said period of time.

10. The mobile station of claim 8, further comprising means for deactivating said timer in response to said determining means determining that said first predetermined number of channel designation codes received at said mobile station during said predetermined period of time match said stored code.

11. The mobile station of claim 10, further comprising:

means for comparing a digital voice color code contained in a burst of information received at said mobile station, after said timer is deactivated, with said stored code to determine whether the received code matches the stored code;

means for detecting whether a second predetermined number of digital voice color codes which do not match said stored code are received at said mobile station; and means for reinitiating said timer to count said predetermined period of time in response to said detecting means detecting that said second predetermined number of digital voice color codes received at said mobile station do not match said stored code.

12. The mobile station of claim 11, wherein said detecting means detects whether said second predetermined number of digital voice color codes which do not match said stored code are consecutive codes received at said mobile station over said channel.

13. The mobile station of claim 8, further including:

means for receiving analog-modulated information transmitted from said base station to said mobile station during a connection over an analog communication channel, and means for detecting whether a supervisory audio tone transmitted with said analog-modulated information over said analog channel is received with said predetermined period of time counted by said timer, and wherein said terminating means is responsive to said detecting means to terminate a connection over said analog communications channel when a supervisory audio tone is not received within said period of time.

14. A method for supervising a call connection in a cellular mobile radio system, said call connection being established between a base station and a mobile station on a digital voice channel, comprising the steps of:

(a) transmitting from said base station to said mobile station a digital voice color code at a time of establishment of said call connection;

(b) receiving said digital voice color code at said mobile station and storing said code;

(c) transmitting bursts of communication data from said base station to said mobile station, specified bursts of communication data having a digital voice color code associated therewith;

(d) initiating a timer to clock a predetermined period of time;

(e) comparing each transmitted code that is received by said mobile station with said code being stored at said mobile station;

(f) deactivating said timer in response to said stored code being equivalent to at least two received codes received at said mobile station which are associated with bursts of communication data from said base station; and (g) disconnecting said call connection in response to said stored code not being equivalent to at least two consecutively received codes received during said predetermined period of time.

15. A method according to claim 14, wherein said timer utilized in said initiating step is also utilized for timing out call connections between said base station and said mobile station made on an analog voice channel.

16. A method according to claim 14, wherein communication between said base station and said mobile station on said digital voice channel is carried out at a designated radio frequency range and during a designated multiplexed time slot of said digital channel.

17. A method according to claim 14, wherein said call connection between said base station and said mobile station is established during a call setup operation.

18. A method according to claim 14, wherein said call connection between said base station and said mobile station is established during a handoff operation.

19. A method according to claim 14, further comprising the steps of:

(h) comparing a digital voice color code associated with a burst of communication data received at said mobile station, after said timer is deactivated, with said stored code to determine whether the received code is equivalent to the stored code;

(i) detecting whether a predetermined number of consecutively received digital voice color codes at said mobile station are not equivalent to said stored code; and (j) returning to step (d) of said method to initiate said timer to clock said predetermined period of time and continuing with the subsequent steps of said method in response to detecting that the predetermined number of consecutively received digital voice color codes are not equivalent to said stored code.

20. A cellular mobile radio communication system, comprising:

a base station including:

(a) means for establishing a communication link on an analog or digital channel, (b) means for generating a digital voice color code, (c) means for providing that said digital voice color code be associated with predetermined bursts of communication data to be transmitted on said digital channel, and (d) means for transmitting bursts of communication data, including said predetermined bursts with said associated digital voice color code, on said digital channel; and a mobile station including:

(a) means for storing said digital voice color code received on said digital channel during establishment of said communication link with said base station, (b) means for receiving said bursts of communication data transmitted on said digital channel, (c) means for decoding the digital voice color code that is associated with said bursts received on said digital channel, (d) means for initiating a timer for timing a predetermined period of time, (e) means for comparing said stored digital voice color code with digital voice color codes associated with said predetermined bursts, (f) means for deactivating said timer in response to said stored digital voice color code being equivalent to a first predetermined number of received digital voice color codes associated with consecutively received predetermined bursts from said base station, and (g) means for disconnecting said communication link in response to said stored digital voice color code not being equivalent to said first predetermined number of received digital voice color codes associated with corresponding predetermined bursts received during said predetermined period of time.

21. A system according to claim 20, wherein said means for providing comprises a modulo two adder which adds said digital code bit-by-bit modulo two to said predetermined bursts of communication data.

22. A system according to claim 21, wherein said means for decoding comprises a modulo two adder.

23. A system according to claim 20, wherein said means for generating produces a (12, 8) Hamming code of which eight bits are utilized for said digital voice color code.

24. A system according to claim 20, wherein said means for timing is also utilized for timing out communication links between said base station and said mobile station which are made on an analog voice channel.

25. A system according to claim 20, wherein said communication link established on said digital channel is established by a call setup operation.

26. A system according to claim 20, wherein said communication link established on said digital channel is established by a handoff operation.

27. A system according to claim 20, wherein said mobile station further includes:

means for comparing digital voice color codes associated with predetermined bursts received at said mobile station after said timer is reset and deactivated with said stored code to determine whether the received codes are equivalent to the stored code;

means for detecting whether a second predetermined number of consecutively received digital voice color codes at said mobile station are not equivalent to said stored code; and means for reinitiating said timer to time said predetermined period of time in response to said detecting means detecting that said second predetermined number of consecutively received digital voice color codes are not equivalent to said stored code.

* * * * *